United States Patent
Lin

(10) Patent No.: US 7,672,386 B2
(45) Date of Patent: Mar. 2, 2010

(54) BEAM FORMING APPARATUS APPLIED IN MULTIPLE INPUT MULTIPLE OUTPUT SYSTEM AND RELATED METHOD

(75) Inventor: Yu-Nan Lin, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 771 days.

(21) Appl. No.: 11/535,492

(22) Filed: Sep. 27, 2006

(65) Prior Publication Data

US 2007/0086542 A1    Apr. 19, 2007

(30) Foreign Application Priority Data

Oct. 14, 2005  (TW)  .............................. 94135883 A

(51) Int. Cl.
*H04K 1/10* (2006.01)
*H04L 27/28* (2006.01)

(52) U.S. Cl. ........................................ 375/260; 375/295

(58) Field of Classification Search ......... 375/259–260, 375/267, 285, 295–296, 299
See application file for complete search history.

(56) References Cited

U.S. PATENT DOCUMENTS

| | | | |
|---|---|---|---|
| 6,687,492 B1 | 2/2004 | Sugar et al. | |
| 6,694,155 B1 * | 2/2004 | Chin et al. | ............... 455/562.1 |
| 6,754,286 B2 | 6/2004 | Hottinen et al. | |
| 6,785,520 B2 | 8/2004 | Sugar et al. | |
| 7,236,538 B1 * | 6/2007 | Banister | ..................... 375/267 |
| 2004/0157646 A1 * | 8/2004 | Raleigh et al. | ........... 455/562.1 |
| 2004/0179627 A1 * | 9/2004 | Ketchum et al. | ............. 375/267 |
| 2005/0286650 A1 * | 12/2005 | Han et al. | .................... 375/267 |
| 2006/0234729 A1 * | 10/2006 | Murakami et al. | .......... 455/462 |

OTHER PUBLICATIONS

[David J. Love; Robert W. Heath, Jr.], [Equal gain transmission in multiple-input multiple-output wirelss systems], [IEEE transactions on communications] , [Jul. 2003], [p. 1102-1110], [vol. 51, No. 7].
[Volker Strumpen; Henry Huffmann; Anant Agarwal], [A stream algorithm for the SVD], [Oct. 22, 2003], [p. 1-29], [Cambridge, USA].

* cited by examiner

Primary Examiner—Jean B Corrielus
(74) Attorney, Agent, or Firm—Winston Hsu

(57) ABSTRACT

A beam-forming apparatus applied in a Multiple Input Multiple Output (MIMO) system and a related method where the MIMO system transmits signals through a plurality of channels. The method includes generating a plurality of channel estimations corresponding to the channels; determining a plurality of first candidate transmitting vectors; selecting a first transmitting vector from the first candidate transmitting vectors according to the channel estimations; determining a plurality of second candidate transmitting vectors orthogonal to the first transmitting vector; selecting a second transmitting vector from the second candidate transmitting vectors according to the channel estimations; generating a plurality of transmitted signals by combining a first data stream and a second data stream according to the first and second transmitting vectors; and respectively transmitting the transmitted signals through a plurality of antennas. The apparatus ensures that power of a data stream is distributed equally for each antenna.

18 Claims, 3 Drawing Sheets

US 7,672,386 B2

BEAM FORMING APPARATUS APPLIED IN MULTIPLE INPUT MULTIPLE OUTPUT SYSTEM AND RELATED METHOD

BACKGROUND OF THE INVENTION

1. Field of the Invention

The present invention relates to a beam-forming apparatus and related method, more particularly, to a beam-forming apparatus applied in a multiple input multiple output system.

2. Description of the Prior Art

A primary concept of a multiple-input multiple-output (MIMO) system is having a plurality of antennas installed on a transmission end and a receiving end for receiving and transmitting data through a channel between the plurality of antennas. For example, please refer to FIG. 1. FIG. 1 illustrates a diagram of a conventional MIMO system 10. The MIMO system 10 includes a transmission end 20 and a receiving end 30, three antennas 22, 24, 26 are installed on the transmission end 20, and two antennas 32, 34 are also installed on the receiving end 30, therefore data transmitted by the transmission end 20 to the receiving end 30 passes through 3*2 channels 42, 44, 46, 48, 52, 54. If the transmission end 20 transmits two data streams D1, D2 simultaneously to the receiving end 30, then the transmission end 20 will multiply the data streams D1, D2 by a gain vector and form three transmitted signals S1, S2, S3 to be transmitted respectively through the antennas 22, 24, 26. A method of generating the transmitted signal S1, S2, S3 can be represented by the following formula:

$$S1 = D1 * V_{1,1} + D2 * V_{1,2} \quad \text{Formula (1)}$$

$$S2 = D1 * V_{2,1} + D2 * V_{2,2} \quad \text{Formula (2)}$$

$$S3 = D1 * V_{3,1} + D2 * V_{3,2} \quad \text{Formula (3)}$$

Regarding the formulas above, the three vectors $[V1,1, V2,1, V3,1]^T$ are utilized for determining the portion of the transmitted signal S1, S2, S3 in the data stream D1, therefore the three vectors $[V1,1, V2,1, V3,1]^T$ can be viewed as a transmitting vector of the data stream D1; similarly, the three vectors $[V1,2, V2,2, V3,2]^T$ are utilized for determining the portion of the transmitted signal S1, S2, S3 in the data stream D2, therefore the three vectors $[V1,2, V2,2, V3,2]^T$ can be viewed as a transmitting vector of the data stream D2.

To separate the data stream D1 from the data stream D2 after the wireless transmission, a conventional technology utilizes a singular value decomposition (SVD) method to determine the transmitting vectors $[V1,1, V2,1, V3,1]^T$, $[V1,2, V2,2, V3,2]^T$, such that the data stream D1 and the data stream D2 are orthogonal to each other. However, the SVD method of generating the transmitting vectors $[V1,1, V2,1, V3,1]^T$, $[V1,2, V2,2, V3,2]^T$ requires a high volume of floating point calculation which guarantees a high volume calculation consumption. Furthermore, in utilizing the SVD method, it is unavoidable that problems will arise. The problems include the power distribution between the antennas being unequal and thereby the high requirement for PA (power amplifier) linearity accompanied with the increase of cost is necessary.

SUMMARY OF THE INVENTION

Therefore, the main objective of the claimed invention is to provide a beam-forming apparatus and method to solve the problems existing in the prior art of as cited earlier.

An embodiment of the claimed invention discloses a beam-forming method applied in a multiple input multiple output (MIMO) system, wherein the MIMO system comprises a transmission end and a receiving end. The transmission end transmits a plurality of transmitted signals to the receiving end through a plurality of channels. The beam-forming method comprises generating a plurality of channel estimations corresponding to the plurality of channels at the receiving end; determining a plurality of first candidate transmitting vectors; selecting a first transmitting vector from the plurality of first candidate transmitting vectors according to the plurality of channel estimations; determining a plurality of second candidate transmitting vectors wherein each second candidate transmitting vector is orthogonal to the first transmitting vector; selecting a second transmitting vector from the second candidate transmitting vectors according to the plurality of channel estimations; and generating the plurality of transmitted signals by combining a first data stream and a second data stream according to the first transmitting vector and the second transmitting vector.

Another embodiment of the claimed invention discloses a beam-forming apparatus applied in a multiple input multiple output (MIMO) system, the MIMO system comprises a transmission end and a receiving end. The transmission end transmits a plurality of transmitted signals to the receiving end through a plurality of channels. The beam-forming method comprises a channel estimator for generating a plurality of channel estimations corresponding to the plurality of channels; a first transmitting vector generating module coupled to the channel estimator for determining a plurality of first candidate transmitting vectors, and selecting a first transmitting vector from the plurality of first candidate transmitting vectors according to the plurality of channel estimations; a second transmitting vector generating module coupled to the channel estimator and the first transmitter vector generating module for determining a plurality of second candidate transmitting vector orthogonal to the plurality of first transmitting vectors, and selecting a second transmitting vector from the plurality of second candidate transmitting vectors according to the plurality of channel estimations; and a data processing module coupled to the first transmitting vector generating module and the second transmitting vector generating module for generating the plurality of transmitted signals by combining a first data stream and a second data stream according to the first transmitting vector and the second transmitting vector.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, consumer electronic equipment manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
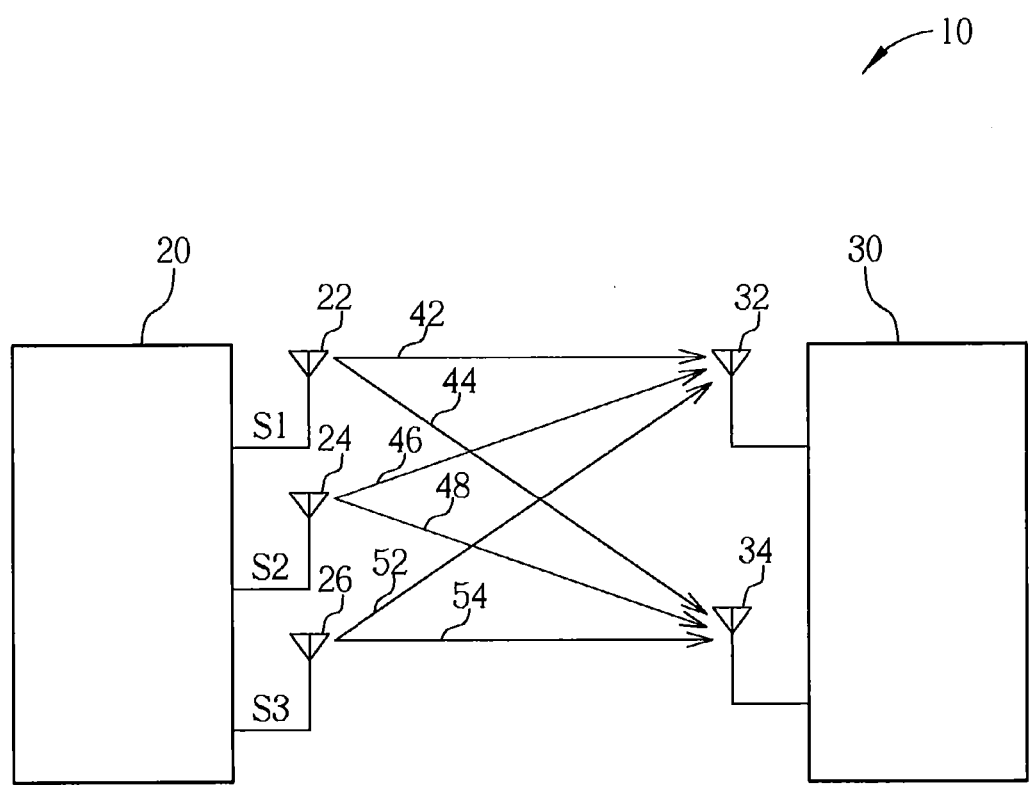
FIG. 1 illustrates a diagram of a conventional MIMO system.
Figure 2:
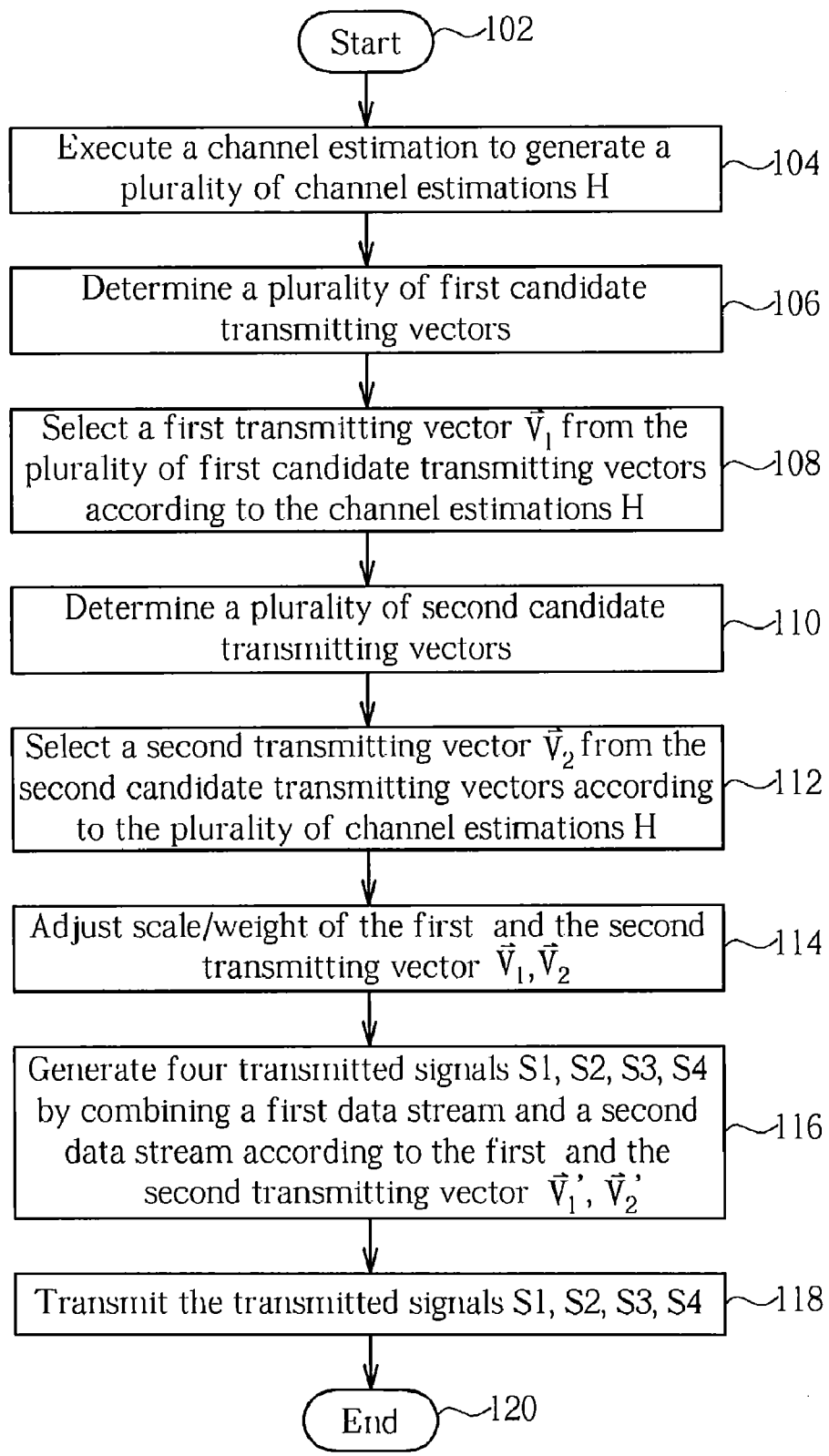
FIG. 2 illustrates an operational flowchart of a beam-forming apparatus according to a preferred embodiment of the present invention.

Please refer to FIG. 2. FIG. 2 illustrates an operational flowchart of a beam-forming apparatus according to a preferred embodiment of the present invention. In this embodiment, the beam-forming apparatus is applied in a multiple input multiple output (MIMO) system, wherein the MIMO system includes a transmission end and a receiving end. The operational flowchart uses the MIMO system to transmit two data stream, as an example, and there are four antennas installed the transmission end and there are two antennas installed on the receiving end. The operation of the beam-forming apparatus includes the following steps:

Step 102: start;

Step 104: execute a channel estimation at the receiving end to generate a plurality of channel estimations H corresponding to the plurality of channels;

Step 106: determine a plurality of first candidate transmitting vectors;

Step 108: select a first transmitting vector $\vec{V}_1$ from the plurality of first candidate transmitting vectors according to the channel estimations H;

Step 110: determine a plurality of second candidate transmitting vectors, and each second candidate transmitting vector is orthogonal to the first transmitting vector $\vec{V}_1$;

Step 112: select a second transmitting vector $\vec{V}_2$ from the second candidate transmitting vectors according to the plurality of channel estimations H;

Step 114: adjust magnitude/weight of the first and the second transmitting vector $\vec{V}_1$, $\vec{V}_2$;

Step 116: generate four transmitted signals S1, S2, S3, S4 by combining a first data stream and a second data stream according to the first transmitting vector $\vec{V}_1$ and the second transmitting vector $\vec{V}_2$;

Step 118: transmit the transmitted signals S1, S2, S3, S4 respectively through the plurality of antennas on the transmission end; and Step 120: end.

As mentioned in the above, the beam-forming apparatus is required to execute a channel estimation to generate the plurality of channel estimations H corresponding to the plurality of channels. Next, the beam-forming apparatus determines the plurality of first candidate vectors $\underline{v}_1$ and selects the first transmitting vector $\vec{V}_1$ from the plurality of first candidate vectors $\underline{v}_1$ according to the channel estimations H. Any first candidate transmitting vector $\underline{v}_1$ generated by the beam-forming apparatus corresponds to four coefficients [V1,1, V2,1, V3,1, V4,1]$^T$, wherein the upper label$^T$ represents a transposition, and the digit on the lower left label represents the corresponding antenna, and the digit on the lower right label represents which candidate transmitting vector, thus for the power of the data stream D1 to be distributed equally for each antenna, an absolute value of each coefficient of the first candidate transmitting vector $\underline{v}_1$ of the embodiment is proximate to a predetermined value "1", therefore each coefficient of the first candidate transmitting vector $\underline{v}_1$ can be generated from the following formula:

$$V_{i,1} = e^{\frac{j2\pi n}{4}}, n = 1, \ldots, 4, i = 1, \ldots, 4 \qquad \text{Formula (4)}$$

The beam-forming apparatus can generate at most $4^4$ types of first candidate transmitting vectors $\underline{v}_1$ However, please note that the method of generating the first candidate transmitting vector $\underline{v}_1$ is not limited to that disclosed by this embodiment, for example the beam-forming apparatus can limit each first candidate transmitting vector $\underline{v}_1$ to require only absolute values of three coefficients are proximate to a predetermined value, and the predetermined value can be adjusted accordingly as required. Next, the beam-forming apparatus utilizes the plurality of channel estimations H to estimate signal to noise ratios (SNR) corresponding to the plurality of first candidate transmitting vectors $\underline{v}_1$. The first transmitting vector $\underline{v}_1$ of the greatest SNR is selected to become the first transmitting vector $\vec{V}_1$. The method of estimating the SNR is shown in the following formula:

$$\gamma(\underline{v}_1) = \underline{v}_1^H H^H H \underline{v}_1 \qquad \text{Formula 5}$$

In formula (5), the upper label$^H$ represents a conjugate transposition. As γ is directly proportional to the SNR corresponding to the transmission vector, therefore the beam-forming apparatus can determine which vector has the greatest SNR according to size of γ corresponding to each first candidate transmitting vector $\underline{v}_1$.

After the first transmitting vector $\vec{V}_1$ is determined, the beam-forming apparatus is required to further generate the second transmitting vector $\vec{V}_2$. Firstly, the beam-forming apparatus determines the plurality of second transmitting vector $\underline{v}_2$, wherein each second candidate transmitting vector $\underline{v}_2$ corresponds to four coefficients [V1,2, V2,2, V3,2, V4,2]$^T$, and also is orthogonal with the first transmitting vector $\vec{V}_1$, therefore the selection of the second candidate transmitting vector $\underline{v}_2$ must be compliant with the following formula:

$$\underline{v}_2^H H^H H \vec{V}_1 = 0 \qquad \text{Formula (6)}$$

Wherein at least one coefficient of each second candidate transmitting vector $\underline{v}_2$ is an orthogonal coefficient that is compliant to Formula (6), and the absolute value of the rest of the coefficient is proximate to a predetermined value such that power of the data stream D2 is equally distributed to each antenna on the transmission end. If the coefficient V4,2 of the second candidate transmitting vector $\underline{v}_2$ is the orthogonal coefficient, then the remaining coefficients V1,2, V2,2, V3,2 are applied to the following formula:

$$V_{i,2} = e^{\frac{j2\pi n}{4}}, n = 1, \ldots, 4, i = 1, \ldots, 3 \qquad \text{Formula (7)}$$

Furthermore, the generation of the coefficient V4,2 is displayed in the following formula:

$$V_{4,2} = \left( \frac{[V'_{1,2} V'_{2,2} V'_{3,2}] H_r(1:3, 1)}{H_r(4, 1)} \right)' \quad \text{Formula (8)}$$

wherein the above label ' represents conjugate plurality, and $H_r = H^H H v_1$ represents the coefficients of $n_1$ to $n_2$ of $H_r$. If $V_{4,2} = V_{3,2}$ is the orthogonal coefficient, the following formula can be obtained:

$$V_{4,2} = V_{3,2} = \left( \frac{[V'_{1,2} V'_{2,2}] H_r(1:2, 1)}{H_r(3, 1) + H_r(4, 1)} \right)' \quad \text{Formula (9)}$$

The selection of the orthogonal coefficient can be selected from the four coefficients $[V1,2, V2,2, V3,2, V4,2]^T$, or the orthogonal coefficient can be selected according to a fixed rule or sequence. Please note, when the number of data streams received by the MIMO system is more than two, the corresponding transmitting vector will also increase. In this case, the method of generating transmitting vectors can be the method above-mentioned. However, a difference does exist, in that a newly generated candidate transmitting vector is required to be orthogonal to all of the previously generated transmitting vectors. Therefore, as the number of previously generated candidate transmitting vectors increases the number of free coefficients of the newly generated candidate transmitting vector decreases. Next, the beam-forming apparatus similarly estimates the γ size corresponding to each second candidate transmitting vector $\underline{v}_2$ and selects a second candidate transmitting vector $\underline{v}_2$ of a greatest SNR from the plurality of second candidate transmitting vectors $\underline{v}_2$ as a second transmitting vector $\vec{V}_2$. The generating of γ is listed in the following formula:

$$\gamma(\underline{v}2) = \underline{v}_2^H H^H H \underline{v}_2 \quad \text{Formula (10)}$$

Please note, the selection of the first, second transmitting vector $\vec{V}_1$, $\vec{V}_2$ from the plurality of first and second transmitting vectors $\underline{v}_1$, $\underline{v}_2$ is not limited to the corresponding SNR. In other words, the channel estimation result can reflect the value of the quality of the signals received by the receiving end for selecting the first and second transmitting vector $\vec{V}_1$, $\vec{V}_2$.

After the first and second transmitting vectors $\vec{V}_1$, $\vec{V}_2$ are generated, the beam-forming apparatus adjusts the magnitude/weight of the first transmitting vector $\vec{V}_1$ and the magnitude/weight of the second transmitting vector $\vec{V}_2$ according to the γ (this can also be adjusted utilizing SNR as previously noted) corresponding to the first and second transmitting vectors $\vec{V}_1$, $\vec{V}_2$. If the first transmitting vector $\vec{V}_1$ corresponds to γ1 and the second transmitting vector $\vec{V}_2$ corresponds to γ2, then the adjusted first and second transmitting vector $\vec{V}_1$, $\vec{V}_2$ can be presented in the following formula (11) or (12):

$$\vec{V}'_1 = \frac{\vec{V}_1}{\sqrt[4]{\gamma 1}} \quad \text{Formula (11)}$$

-continued $$\vec{V}'_2 = \frac{\vec{V}_2}{\sqrt[4]{\gamma 2}} \quad \text{Formula (12)}$$

$$\vec{V}'_1 = \frac{\vec{V}_1}{\sqrt[8]{\gamma 1}} \quad \text{Formula (13)}$$

$$\vec{V}'_2 = \frac{\vec{V}_2}{\sqrt[8]{\gamma 2}} \quad \text{Formula (14)}$$

Wherein when the number of antenna is greater than (or equal to) the number of data stream, formula (11) and (12) can be utilized, on the other hand, not limited to the bounds of the claims, formula (13) and (14) can also be utilized. Please note, the adjusting method of the first and second transmitting vector $\vec{V}_1$, $\vec{V}_2$ is not limited to only the above-mentioned whereas the SNR can be utilized in a method of adjusting the magnitude/weight of the first and second transmitting vector $\vec{V}_1$, $\vec{V}_2$, utilized in the present invention. Lastly, the beam-forming apparatus combines the data streams D1, D2 to generate the plurality of signals S1, S2, S3, S4 to be transmitted respectively through the four antennas on the transmission end as transmitted signals S1, S2, S3, S4.

Figure 3:
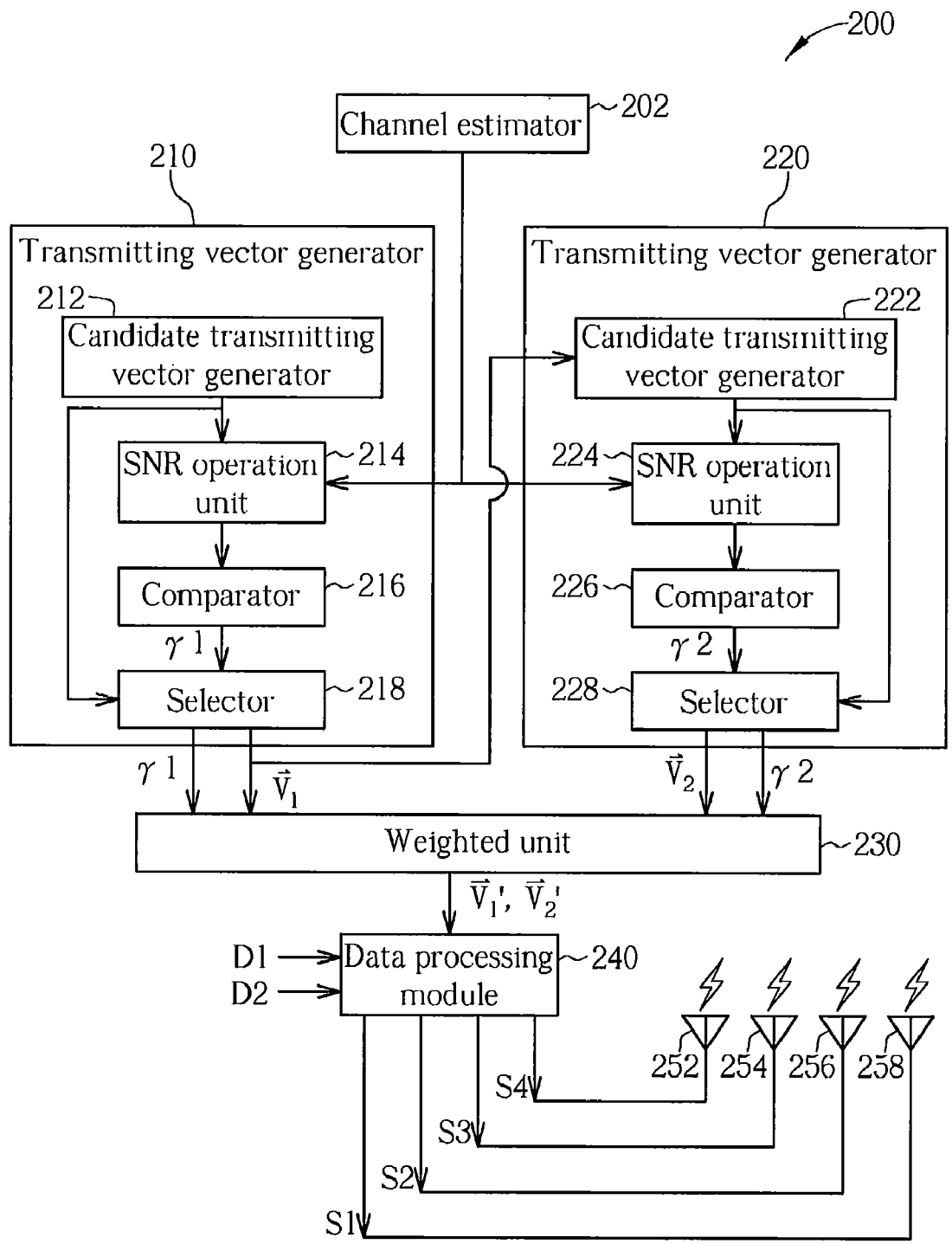
FIG. 3 illustrates a functional block diagram of a beam-forming Apparatus according to a preferred embodiment of the present invention.

Please refer to FIG. 3. FIG. 3 illustrates a functional block diagram of a beam-forming apparatus 200 according to a preferred embodiment of the present invention. As shown in FIG. 3, the beam-forming apparatus 200 includes a channel estimator 202, transmitting vector generators 210, 220, a weighted unit 230 and a data processing module 240. The transmitting vector generator 210 further includes a candidate transmitting vector generator 212, a signal to noise ratio (SNR) operation unit 214, a comparator 216, and a selector 218. The transmitting vector generator 220 further includes a candidate transmitting vector generator 222, an SNR operation unit 224, a comparator 226, and a selector 228. Firstly, the channel estimator 202 generates a channel estimation H, and the candidate transmitting vector generator 212 then generates a plurality of first candidate transmitting vectors and transmits the plurality of first candidate transmitting vectors to the SNR operation unit 214 for calculating an SNR γ corresponding to each first candidate transmitting vector. Next, the comparator 226 locates a greatest value γ1 of the plurality of SNRs, and then the selector 228 selects the greatest value γ1 from the plurality of first candidate transmitting vectors as a first transmitting vector $\vec{V}_1$. When the first transmitting vector $\vec{V}_1$ is generated, the candidate transmitting vector generator 222 generates a plurality of second candidate transmitting vectors orthogonal to the first transmitting vector $\vec{V}_1$, next the SNR operation unit 224 calculates an SNR γ corresponding to each second candidate transmitting vector, and the plurality of SNRs is being transmitted to the comparator 226 for locating a greatest value γ2 of the plurality of SNRs γ. Next, the selector 228 selects the greatest value γ2 from the plurality of second candidate transmitting vectors as a second transmitting vector $\vec{V}_2$. When the first and second transmitting vectors $\vec{V}_1$, $\vec{V}_2$ are generated, the weighted unit 230 adjusts the magnitude/weight of the first and second transmitting vectors $\vec{V}_1$, $\vec{V}_2$ according to the SNRs γ1, γ2. Lastly, the data processing module 240 generates a plurality of transmitted signals S1, S2, S3, S4 according to the adjusted first and second transmitted vectors $\vec{V}_1$, $\vec{V}_2$ and the data streams D1, D2, the plurality of transmitted signals S1, S2, S3, S4 are then respectively transmitted through a plurality of antennas 252, 254, 256, 258.

Please note, a portion of the beam-forming apparatus 200 is located in the transmission end of the MIMO system, while the other portion is located in the receiving end of the MIMO system. In this embodiment, the channel estimator 202, the transmitting vector generators 210, 220 and the weighted unit 230 are located at the receiving end; the data processing module 240 is located at the transmission end, therefore, the receiving end performs a feedback of the first and second transmitting vectors $\vec{V}_1$, $\vec{V}_2$ to the transmission end so that the data processing module 240 at the transmission end can combine the data streams D1, D2 to generate the plurality of transmitted signals S1, S2, S3, S4. However, in another embodiment of the present invention, the channel estimator 202 is installed at the receiving end, and the transmitting vector generators 210, 220, the weighted unit 230 and the data processing module 240 are installed at the receiving end, hence the receiving end only performs the channel estimation and transmits the channel estimation result back to the transmission end, while all of the other processes will be performed by the transmission end.

Furthermore, the beam-forming apparatus of the present invention can be applied in an orthogonal frequency division multiplexing (OFDM) system, a transmission vector is utilized to combine data stream corresponding to each subcarrier of the OFDM system, hence transmission power of an OFDM signal formed by an inverse Fourier transform at different antenna can be more equalized such that the complex high frequency circuit can be simplified.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A beam-forming method applied in a multiple input multiple output (MIMO) system, the MIMO system comprising a transmission end and a receiving end, the transmission end being utilized for transmitting a plurality of transmitted signals to the receiving end through a plurality of channels, the beam-forming method comprising:
   generating a plurality of channel estimations corresponding to the plurality of channels at the receiving end;
   determining a plurality of first candidate transmitting vectors;
   selecting a first transmitting vector from the plurality of first candidate transmitting vectors according to the plurality of channel estimations;
   determining a plurality of second candidate transmitting vectors wherein each second candidate transmitting vector is orthogonal to the first transmitting vector;
   selecting a second transmitting vector from the second candidate transmitting vectors according to the plurality of channel estimations; and
   generating the plurality of transmitted signals by combining a first data stream and a second data stream according to the first transmitting vector and the second transmitting vector.

2. The beam-forming method of claim 1 wherein the step of selecting the first transmitting vector comprises:
   selecting the first transmitting vector from the plurality of first candidate transmitting vectors according to a signal to noise ratio (SNR) corresponding to each first candidate transmitting vector; and
   the step of selecting the second transmitting vector comprising:
   selecting the second transmitting vector from the plurality of second candidate transmitting vectors according to a SNR corresponding to each second candidate transmitting vector.

3. The beam-forming method of claim 2 wherein the step of selecting the first transmitting vector comprises:
   calculating a plurality of first SNRs corresponding to the plurality of first candidate transmitting vectors according to the plurality of channel estimations and the plurality of first candidate transmitting vectors; and
   selecting a first candidate transmitting vector of a first predetermined SNR to be the first transmitting vector; and
   the step of selecting the second transmitting vector comprising:
   calculating a plurality of second SNRs corresponding to the plurality of second candidate transmitting vectors according to the plurality of channel estimations and the plurality of second candidate transmitting vectors; and
   selecting a second candidate transmitting vector of a predetermined second SNR to be the second transmitting vector.

4. The beam-forming method of claim 3 wherein the first predetermined SNR is the greatest value of the plurality of first SNRs, and the second predetermined SNR is the greatest value of the plurality of second SNRs.

5. The beam-forming method of claim 1 wherein the first candidate transmitting vector corresponds to n coefficient, and n coefficient of each first candidate transmitting vector is proximate to a first predetermined value.

6. The beam-forming method of claim 5 wherein each second candidate transmitting vector corresponds to n coefficient, and n−1 coefficient of each second candidate transmitting vector is proximate to a second predetermined value.

7. The beam-forming method of claim 1 wherein the first transmitting vector corresponds to a first SNR and the second transmitting vector corresponds to a second SNR, and the beaming-forming comprising adjusting the magnitude of the first transmitting vector or the second transmitting vector according to the first SNR and the second SNR.

8. The beam-forming method of claim 7 wherein the step of adjusting the first transmitting vector or the second transmitting vector comprises:
   shrinking the first transmitting vector or enlarging the second transmitting vector when the first SNR is greater than the second SNR; and
   enlarging the first transmitting vector or shrinking the second transmitting vector when the first SNR is less than the second SNR.

9. The beam-forming method of claim 1 wherein the MIMO system utilizes an orthogonal frequency division multiplexing (OFDM) method to transmit and receive the plurality of the data stream.

10. A beam-forming apparatus applied in a multiple input multiple output (MIMO) system, the MIMO system comprising a transmission end and a receiving end, the transmission end being utilized for transmitting a plurality of transmitted signals to the receiving end through a plurality of channels, the beam-forming apparatus comprising:
   a channel estimator for generating a plurality of channel estimations corresponding to the plurality of channels;
   a first transmitting vector generating module coupled to the channel estimator for determining a plurality of first candidate transmitting vectors, and selecting a first transmitting vector from the plurality of first candidate transmitting vectors according to the plurality of channel estimations;

a second transmitting vector generating module coupled to the channel estimator and the first transmitting vector generating module for determining a plurality of second candidate transmitting vector orthogonal to the plurality of first transmitting vectors, and selecting a second transmitting vector from the plurality of second candidate transmitting vectors according to the plurality of channel estimations; and a data processing module coupled to the first transmitting vector generating module and the second transmitting vector generating module for generating the plurality of transmitted signals by combining a first data stream and a second data stream according to the first transmitting vector and the second transmitting vector.

11. The beam-forming apparatus of claim 10 wherein the first transmitting vector generating module selects the first transmitting vector from the plurality of first candidate transmitting vectors according to a signal to noise ratio (SNR) corresponding to each of the first candidate transmitting vector, and the second transmitting vector generating module selects the second transmitting vector from the plurality of second candidate transmitting vectors according to an SNR corresponding to each of the second candidate transmitting vector.

12. The beam-forming apparatus of claim 11 wherein the first transmitting vector generating module comprises:
a first candidate transmitting vector generating unit for determining the plurality of first candidate transmitting vectors;
a first SNR operation unit coupled to the first candidate transmitting vector generating unit and the channel estimator for calculating a plurality of first SNRs corresponding to the plurality of first candidate transmitting vectors according to the plurality of channel estimations and the plurality of the first candidate transmitting vectors;
a first comparator coupled to the first SNR operation unit for selecting a predetermined first SNR of the plurality of first SNRs; and
a first selector coupled to the first comparator and the first candidate transmitting vector generating unit for selecting a first candidate transmitting vector corresponding to the predetermined first SNR as the first transmitting vector; and
the second transmitting vector generating module comprising:
a second candidate transmitting vector generating unit for determining the plurality of second candidate transmitting vectors;
a second SNR operation unit coupled to the second candidate transmitting vector generating unit and the channel estimator for calculating a plurality of second SNRs corresponding to the plurality of second candidate transmitting vectors according to the plurality of channel estimations and the plurality of the second candidate transmitting vectors;
a second comparator coupled to the second SNR operation unit for selecting a predetermined second SNR of the plurality of second SNRs; and
a second selector coupled to the second comparator and the second candidate transmitting vector generating unit for selecting a second candidate transmitting vector corresponding to the predetermined second SNR as the second transmitting vector.

13. The beam-forming apparatus of claim 12 wherein the predetermined first SNR is the greatest value of the plurality of first SNRs, and the second predetermined SNR is the greatest value of the plurality of second SNRs.

14. The beam-forming apparatus of claim 10 wherein the first candidate transmitting vector corresponds to n coefficient, and n coefficient of each first candidate transmitting vector is proximate to a first predetermined value.

15. The beam-forming apparatus of claim 14 wherein each second candidate transmitting vector corresponds to n coefficient, and n−1 coefficient of each second candidate transmitting vector is proximate to a second predetermined value.

16. The beam-forming apparatus of claim 10 wherein the first transmitting vector corresponds to a first signal to noise ratio (SNR) and the second vector corresponds to a second SNR, and the beam-forming apparatus further comprising a weighted unit coupled respectively to the first transmitting vector generating module, the data processing module and the second transmitting vector generating module for adjusting the magnitude of the first transmitting vector or the second transmitting vector.

17. The beam-forming apparatus of claim 16 wherein the weighted unit shrinks the first transmitting vector or enlarges the second transmitting vector when the first SNR is greater than the second SNR; the weighted unit enlarges the first transmitting vector or shrinks the second transmitting vector when the first SNR is less than the second SNR.

18. The beam-forming apparatus of claim 10 wherein the MIMO system utilizes an orthogonal frequency division multiplexing (OFDM) method to transmit and receive the plurality of data stream.

* * * * *